United States Patent [19]

Stallwitz et al.

[11] Patent Number: 5,779,401
[45] Date of Patent: Jul. 14, 1998

[54] CUTTING INSERT

[75] Inventors: Erwin Stallwitz, Lichtenau; José Agustin Paya; Klaus Mader, both of Mülheim; Dirk Retzkowski, Gelsenkirchen, all of Germany

[73] Assignee: Widia GmbH, Essen, Germany

[21] Appl. No.: 615,301

[22] PCT Filed: Jul. 29, 1994

[86] PCT No.: PCT/DE94/00896

§ 371 Date: Apr. 2, 1996

§ 102(e) Date: Apr. 2, 1996

[87] PCT Pub. No.: WO95/07783

PCT Pub. Date: Mar. 23, 1995

[30] Foreign Application Priority Data

Sep. 13, 1993 [DE] Germany ............... 43 30 816.3
Oct. 22, 1993 [DE] Germany ............... 43 36 055.6

[51] Int. Cl.[6] ............................................... B23B 27/10
[52] U.S. Cl. ........................... 407/114; 407/11; 407/117
[58] Field of Search ........................... 407/42, 61, 114, 407/117, 113

[56] References Cited

U.S. PATENT DOCUMENTS

| 4,140,431 | 2/1979 | Friedline | 407/114 |
| 4,248,553 | 2/1981 | Kraemer | 407/114 |
| 4,992,007 | 2/1991 | Satran | 407/117 |
| 5,423,639 | 6/1995 | Wiman | 407/117 |
| 5,439,327 | 8/1995 | Wertheim | 407/117 |
| 5,549,424 | 8/1996 | Bernadic et al. | 407/114 |

FOREIGN PATENT DOCUMENTS

| 0 213 494 A1 | 3/1987 | European Pat. Off. . |
| 0 312 223 A1 | 4/1989 | European Pat. Off. . |
| 0 534 450 A3 | 3/1993 | European Pat. Off. . |
| 0 555 192 A1 | 8/1993 | European Pat. Off. . |
| 0 587 109 A1 | 3/1994 | European Pat. Off. . |
| 42 01 112 A1 | 7/1993 | Germany . |
| 1577-180 A | 5/1991 | U.S.S.R. . |

Primary Examiner—Daniel W. Howell
Assistant Examiner—Mark Williams
Attorney, Agent, or Firm—Herbert Dubno; Andrew Wilford

[57] ABSTRACT

The invention relates to a cutting insert (100; 200) for material-removing machining, especially turning, grinding, engraving and boring a workpiece (36), the at least one-sided overlap of which forms the first face (28) with at least one cutting edge (26) and the surrounding side surfaces of which form at least one free face (29). To improve cutting effectiveness, the flank (29) has one or more recesses (32) at a distance ($h_1$) from the cutting edge (26; 34).

25 Claims, 8 Drawing Sheets

CUTTING INSERT

CROSS REFERENCE TO RELATED APPLICATIONS

This application is the U.S. national phase of PCT application PCT/DE94/00896 filed 29 Jul. 1994 with a claim to the priorities of German applications P 43 30 816.3 and P 43 36 055.6 respectively filed 13 Sep. 1993 and 22 Oct. 1993.

FIELD OF THE INVENTION

The invention relates to a cutting insert for chip-removing machining, in particular for turning, milling, plunge-cutting, and boring of a workpiece, having on at least one side a cutting surface with at least one cutting edge and a land extending therearound.

BACKGROUND OF THE INVENTION

Cutting inserts of this type have at least one planar land at a free angle between 0° and 30°.

European 0,457,488 describes a cutting insert for a drill bit having four cutting corners, two lands lying on opposite sides of the cutting insert each with a projection adjacent the respective cutting corner, a falling flank, and a part set back relative to the projection. The set-back part is formed by a first region adjacent the cutting edge and inclined thereto at a positive angle of 7° to 20°, a second region bordering the lower base edge and inclined at a second positive but substantially smaller angle, and a third region joining the other two regions. The second-lower region is a large surface and engages the side of the workpiece during drilling. This construction gives good support with a small free angle.

During drilling with cutting inserts the cutting inserts are set relative to the longitudinal axis of the bore hole on their supports, that is slightly tipped, so as to achieve greater bit stability and to eliminate vibration.

To stabilize the cutting edge it has been suggested to use a negative land on the cutting surface or to minimize the free angle.

German 3,839,804 describes and illustrates an indexable cutting plate particularly for embossing-blade heads which should produce a particularly smooth ridge- and chatter-free surface during milling. This indexable cutting plate has curved cutting edges with a substantially larger radius than the cutting-edge length with a correspondingly curved cutting surface as well as planar support surfaces whose shapes are parabolic or hyperboloidal.

European 0,414,249 describes a cutting insert whose cutting surface has trapezoidal recesses interrupting the cross section of the cutting edge and grooves that run to the land and extend over their entire length perpendicular to the cutting edge.

German utility model 7,600,988 shows a cutting-insert plate with a toothed cutting-edge shape, with the teeth extending also over the entire land. The same is true for the cutting inserts according to European 9,141,576 and U.S. Pat. No. 5,158,401.

Grooves with widths decreasing perpendicular to the cutting edge are described in European 0,213,494. Finally European 0,094,921 describes a cutting insert with grooves in opposite side faces, the grooves having flanks which are inclined to each other so as to produce a varying trapezoidal width at different spacings from the cutting edge.

A cutting insert is described in European 9,534,450 which has recesses extending from the base to interrupt the edge and having a depth which is twice the maximum wear-mark width. The recesses are supposed merely to serve to conduct a coolant to near the cutting edge.

It is therefore an object of the invention to optimize the geometry of the above-described cutting insert so that it cuts much better. Meanwhile the cutting should be easier to guide and there should be less vibration so as to reduce land wear, chatter, and cut-perpendicular cutting force (perpendicular to the machine spindle) so that a substantially greater service life is achieved. In addition the wear mark width should be reduced. The cutting insert should be producible if possible by metal-powder sintering and/or by isostatic hot pressing or machining.

These objects are attained by the features of claim 1.

Thus the land has at a predetermined spacing from the cutting edge adjacent the land one or more land elements of similar or different shape formed as projections and/or recesses with a depth between 0.03 mm and 0.3 mm. This reduces the tendency to wear and imparts to the land in perpendicular section different free angles along the land or along the cutting edge. The transitions can be concave, convex, or even straight.

At least one land element is curved convexly or concavely, that is as a trough.

According to a particular embodiment of the invention the land bordering the cutting edge has a contact zone which lies during machining against the workpiece.

This contact zone, which runs with uniform height below the cutting edge, has a minimum height of 0.05 mm. Preferably the recesses extend right to the contact zone, that is partially interrupt same in a lower region.

The above-described recesses can be arranged in the most different land shapes. Preferably the lands are curved or have at least one contact zone such that the contact zone is generally planar up to the recesses and joins the next land part with a greater positive angle.

According to an embodiment of the invention the height of the contact zone and/or a spacing of the recesses from the cutting edge is 0.05 mm to 1 mm, preferably 0.05 mm to 0.2 mm. The projections forming land elements can extend to the cutting edge or have a spacing from the cutting edge of up to 1.5 mm. Preferably the spacing is 0.1 mm to 1 mm.

The first positive free angle of the contact zone is 5° larger than the free angle of the adjacent land region, this second angle, which if necessary is measured as a variable tangential angle (in a rounded embodiment) is between 5° and 30°.

The land elements are in top view preferably round, rectangular, triangular, elongatedly circular, or elongated oval, and according to an embodiment the shape the longitudinal axes of the recesses forms with a perpendicular to the cutting edge on the land an angle lies between 0° and 45°, preferably 0° to 10°. The longitudinal axes of the recesses can be parallel or variously tipped relative to each other. Preferably the recesses define a shape that is part of a cylinder with a semispherical head, a cone, or another rotation-symmetrical body, which preferably has a diameter between 0.5 mm and 20 mm, preferably between 7 mm and 14 mm. The recesses can be of the same or of different lengths. The land elements, in particular recesses, can extend to the base surface or end there at a spacing of 0 mm, preferably the spacing is equal to half the land height or 0.5 mm to 1 mm.

Measured parallel to the cutting edge the width of the recesses is equal according to a particular embodiment of the invention to between $\frac{1}{10}$ to $\frac{1}{3}$ of the cutting-edge length and/or the similarly measured spacing of the recesses is equal to between 1/10 to 1/2 of the length of the cutting edge. The above-described spacings and width define the number of recesses per land.

According to a further embodiment of the invention the width and/or the spacing of the recesses is the same over the entire land. The recesses and/or projections are of different widths and/or are differently spaced from one another if this optimizes cutting characteristics. It is in particular possible that all widths and spacings are different. Preferably the recesses are arranged symmetrically to a perpendicular to the center of the cutting edge on the land.

Pyramidal or frustopyramidal shapes are usable as land elements. These shapes can be either regular or irregular or asymmetrical, with in particular two long base-side edges that extend an angle of 5° to 30°, preferably 10° to 20° relative to each other while the shorter base side edges extend parallel to each other and to the cutting edge. According to a further embodiment of the invention the projections are wedge shaped with an upper scratch edge as a border between two inclined tetrahedral side surfaces and with end points that form the upper corners of two respective inclined triangular side faces. The pyramid top faces can be planar or curved, that is the scratch edge can be made straight or curved. Preferably the curvature or arc is (regularly) convex or concave. According to a further embodiment of the invention the frusto pyramid can be in top view mirror asymmetrical with respect to its longitudinal axis. Similarly the pyramid top surface can be lie at an angle to the land. The pyramid or frustopyramid side faces are planar or lightly convex or concave. Preferably the edges delimiting the pyramid or frustopyramid side faces are rounded. The inclination of two pyramid side flanks that do not have a common edge extend to each other at an angle of 30° to 60°, preferably 35° to 50°.

According to a preferred embodiment of the invention the land has in perpendicular section different free angles, in particular the contact zone is generally planar with respect to its height and forms a first positive free angle and that land adjacent to the contact zone forms a second positive angle, if necessary as a variable free angle which is between 5° and 30°, preferably 2° to 5° less than the first free angle. The transitions between the land sections arranged at various lower free angles to each other are formed concave, convex, and/or straight.

Embodiments of the invention are shown in the drawings. Therein.

Figure 1:
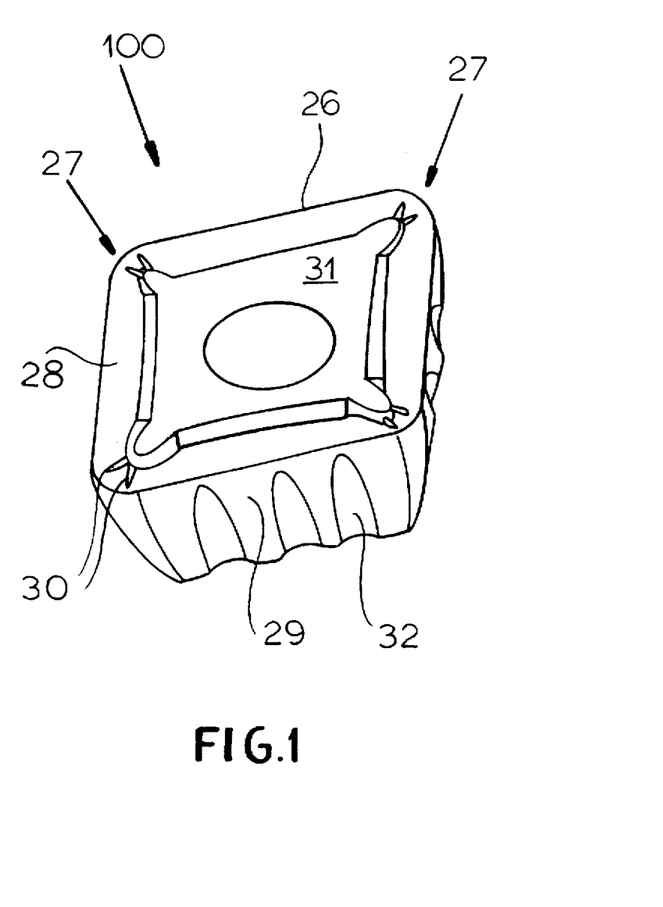
FIG. 1 is a elevational view of a first cutting insert according to the invention with four cutting edges.

FIG. 1 shows an embodiment of a cutting insert 100. The type of cutting inserts according to the invention can have different shapes, as in particularly right-angle quadrilateral, rhombic, triangular, rounded, or hexagonal. Embodiments that are plunge tools 25 (see FIG. 3) are possible. Each of the described cutting inserts has at least one cutting edge 26 which can either be straight, a convex curve, a concave curve, or wavy. The cutting edge is limited laterally by cutting corners 27 and the border between the cutting surface 28 and the land 29 is formed curved according to the invention seen in a direction perpendicular to the cutting edge. The cutting inserts 20 through 25 can be recessed toward their centers or formed with a raised middle part 31. According to FIG. 1 longitudinal ribs 30 extend symmetrically from the raised middle part 31 toward diagonals of the cutting surface and extend toward the cutting edge 26. The formation of these longitudinal ribs and wedges 30 is described in German patent document P 41 36 417.1 to which reference is here made.

Figure 2:
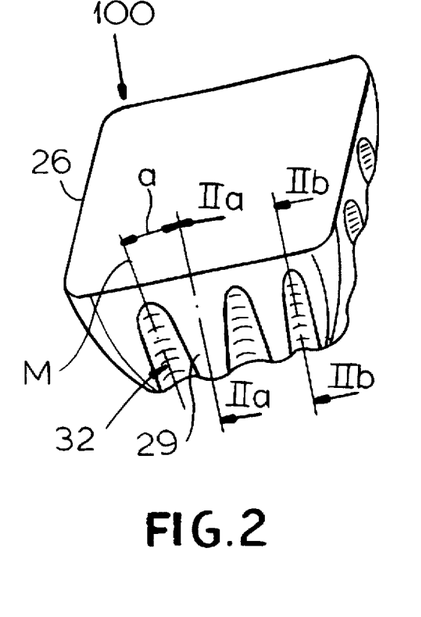
FIG. 2 is a further embodiment of the cutting insert with recesses in the rounded lands.
Figure 2A:
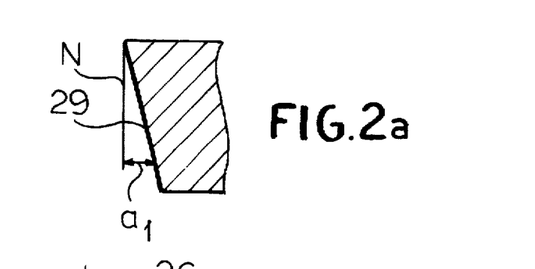
FIG. 2a is a section along line A—A of FIG. 2.
Figure 2B:
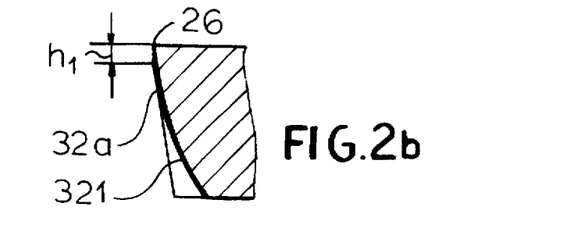
FIG. 2b is a section along line B—B of FIG. 2.
Figure 4:
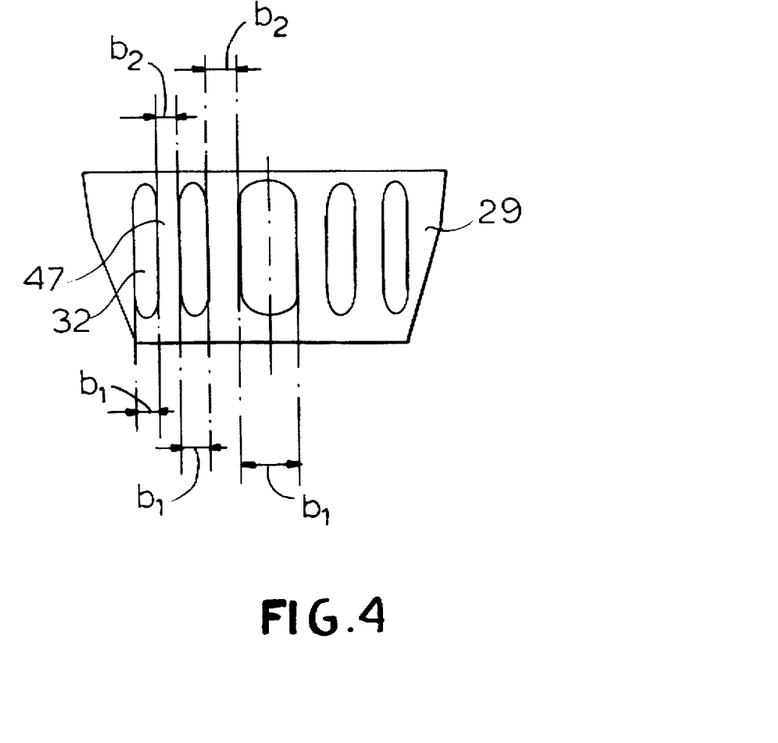
FIGS. 4 and 5 are cutting inserts with differently sized recesses in the land.

According to a further embodiment of the cutting insert (see FIG. 2) its land 29 has recesses 32 whose shape runs conically upward to a sharp point as shown in FIG. 2 or elongated round or elongated oval as described with reference to FIGS. 4 through 6. Here the inclination of the longitudinal central axis M to a perpendicular N to the cutting edge has an angle α between 0° and ±30°. The land can be formed rounded as shown in FIG. 2 or—as seen in section in FIG. 2a—can be planar except at the land element regions. The sectional view of FIG. 2a shows a planar land 29 which forms an angle $α_1$ to a perpendicular N to the cutting edge. As shown in FIG. 2b the upper edge of the recess 32, where the base 321 merges into the land 29, has a spacing $h_1$ from the cutting edge 26.

Figure 2C:
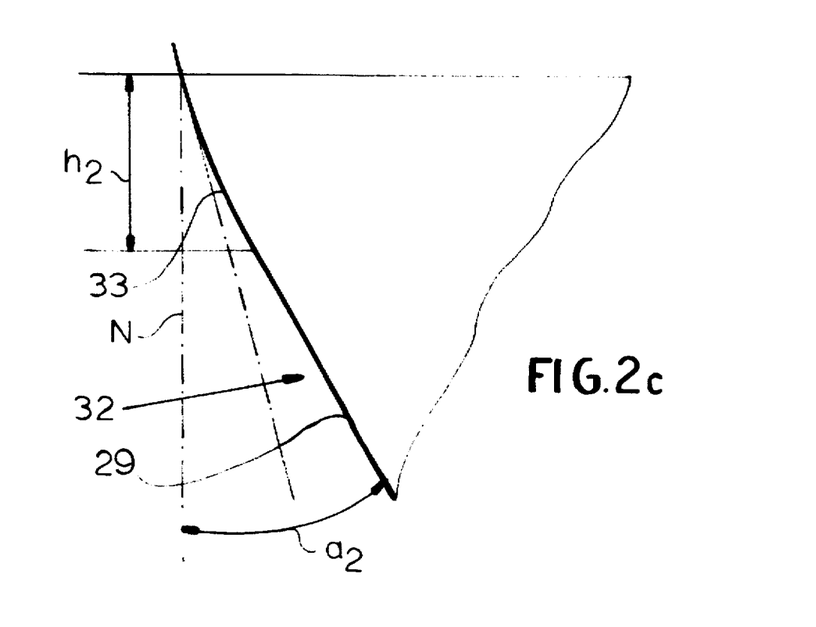
FIG. 2c is a partial edge view of the land.

In particular the cutting insert can be so constructed that the land is in contact over the height $h_2$ with the workpiece being cut, so as to form a contact zone 33. The height $h_3$ of this contact zone 33 is at least as great as the height $h_1$ but can be larger so that the recesses 32 partially interrupt the planar or curved contact zone 33. The recess 32 can also as shown FIG. 2c extend at an angle $α_2$ ($>α_1$) or generally straight relative to the vertical elongation.

Figures 3, 3A:
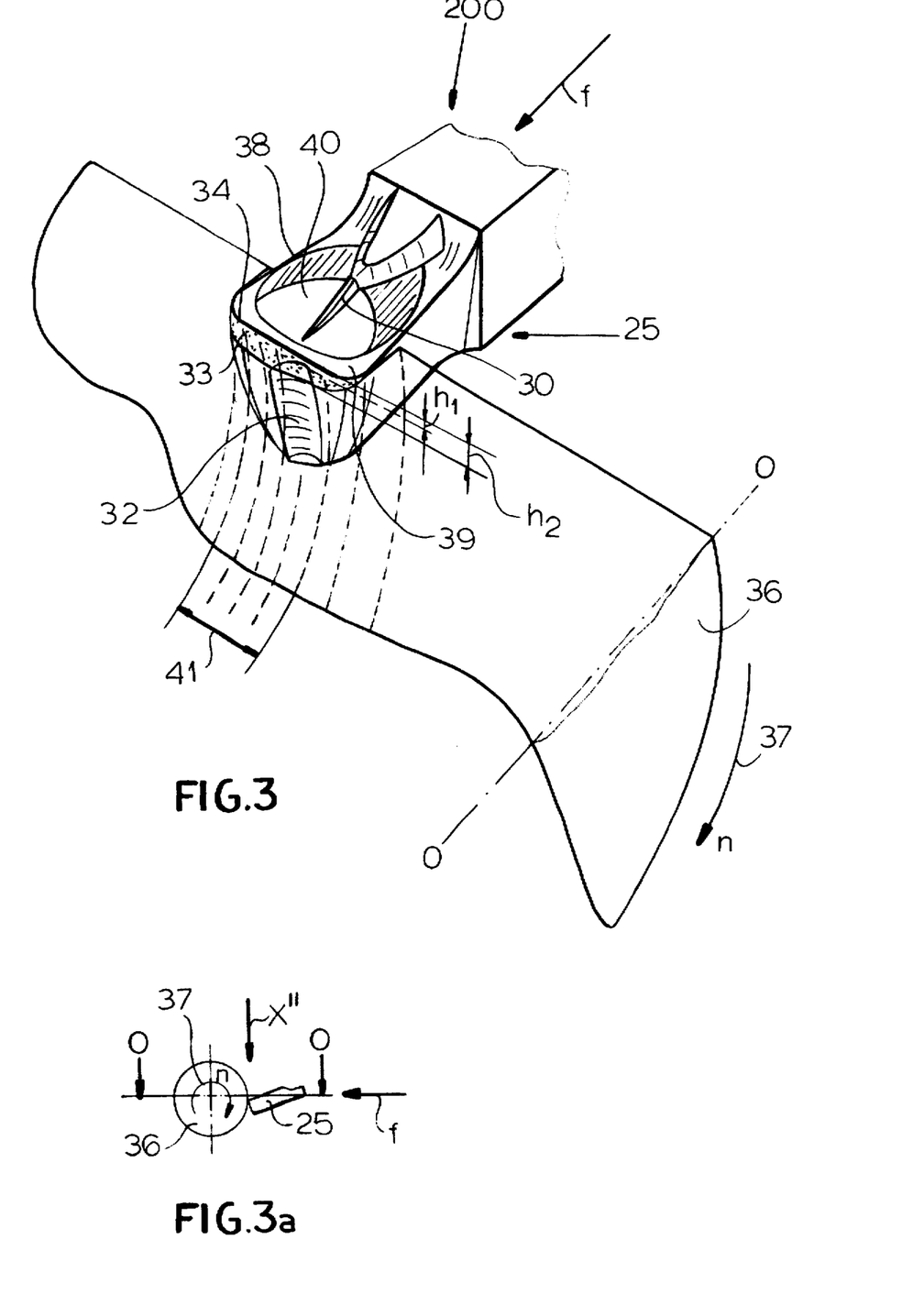
FIG. 3 is a further embodiment of a cutting insert made as a plunge tool with a rounded land.
FIG. 3a is a side view of the tool according to FIG. 3 while plunge cutting a shaft.

The embodiment shown in FIG. 3 of the cutting insert 200 used as a plunge insert 25 has a main cutting edge 34 from which extends on the land with a height $h_2$ the above-described contact zone 33. FIG. 3 shows how on machining the workpiece 36 that is rotated with a rotary speed n in the direction of the arrow 37 as a result of the rounded convex shape the cutting tool only engages the workpiece in the region of the contact zone 33 with the land. The cutting insert has auxiliary cutting edges 38 which extend at an acute angle to each other. The cutting insert can be provided with a further land or as illustrated with wavy chip-shaping elements 30 of which only one is shown that extends perpendicular to the center of the main cutting edge. Behind the land 39 which is of greatest width at the cutting corners and which narrows toward the center of the main cutting edge as well as toward the auxiliary cutters there is a chip-shaping trough 40. The plunge insert 25 is moved with an advance speed f. As illustrated the contact zones 33 form a slide zone 41 on plunging into and forming a groove in the workpiece 36. The height $h_2$ of the contact zone increases with increasing wear of the land.

All the lands can be formed with land elements which are discussed more fully with reference to FIGS. 4 through 6c.

In a land 29 formed with regions having two different land angles there are elongated oval recesses 32 of various widths $b_1$, the widths of these recesses decreasing from a perpendicular to the middle of the cutting edge in the land toward the corners, i.e. the recesses 32 become narrower. Correspondingly the spacings $b_2$ shown at 47 of the recesses 32 change toward the cutting corners to smaller values. The recesses 32 according to FIG. 4 are of the same length and each have the same spacing from the cutting edge or to the base.

Figure 5:
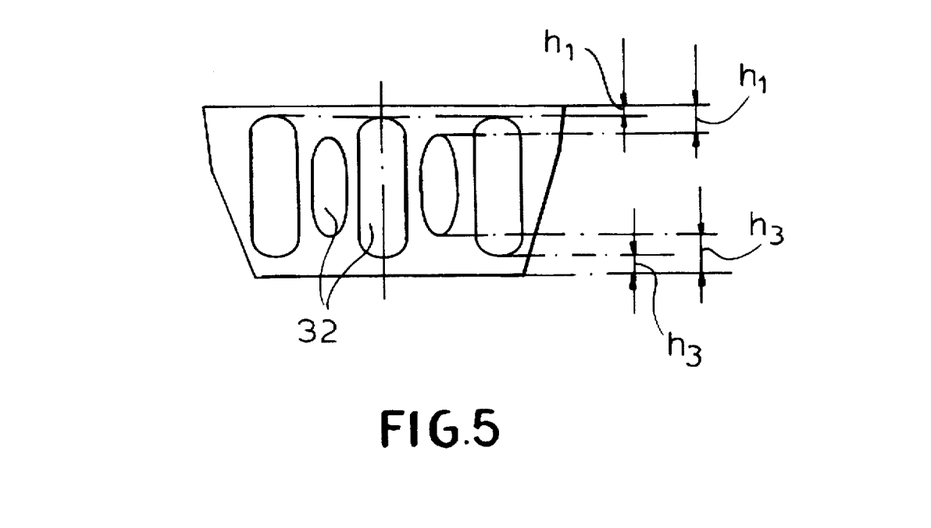

The recesses 32 according to FIG. 5 which are equidistant and similar have on the other hand different lengths resulting in different spacings $h_1$ to the cutting edge and spacings $h_2$ to the base. Such recesses are also usable according to the invention which have different widths and spacings as shown in FIG. 4 with different lengths. The preferred dimension for the spacing $h_1$ is 0.05 mm to 0.2 mm while $h_2$ is equal to 0.5 mm to 1 mm. A dimension is used for the widths of the recesses 32 that is preferably 1/10 to 1/3 of the length of the cutting edge, while the spacing is 1/10 to 1/2 of the length of the cutting edge. In a further unillustrated embodiment recesses of smaller width alternate with recesses of greater width which also are asymmetrical to a central perpendicular to the cutting edge on the land. The same is true for the spacings of the recesses 32 from the cutting edge or from the base which are the same, different, alternating bigger or smaller, or of increasing or decreasing size.

Figure 6:
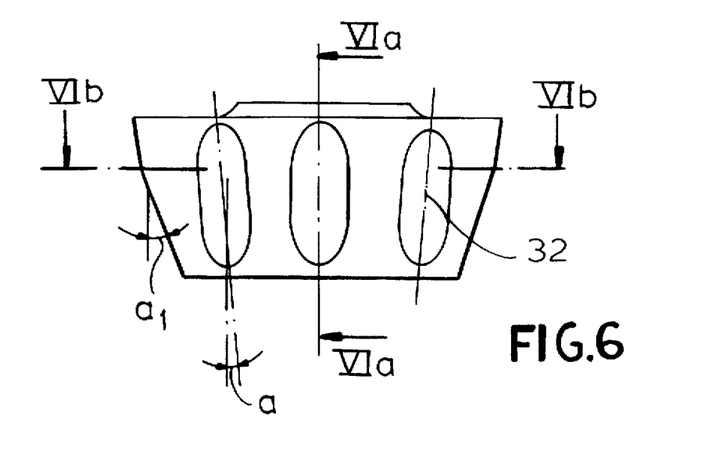
FIG. 6 is a cutting insert with differently inclined recesses in the land.
Figure 6A:
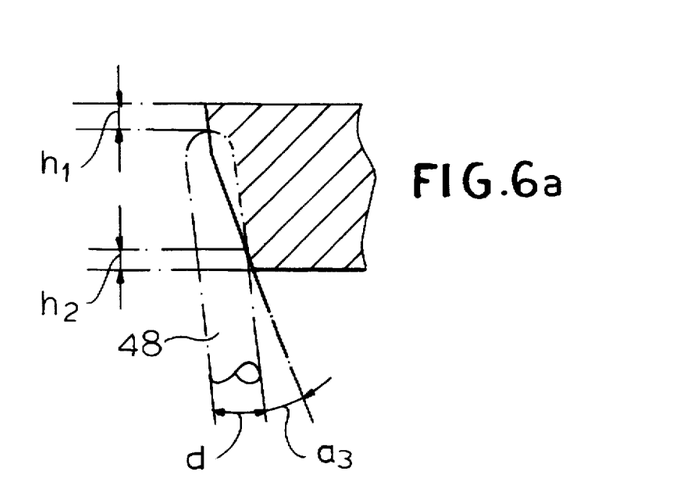
FIG. 6a is a section taken along line A—A of FIG. 6.
Figure 6B:
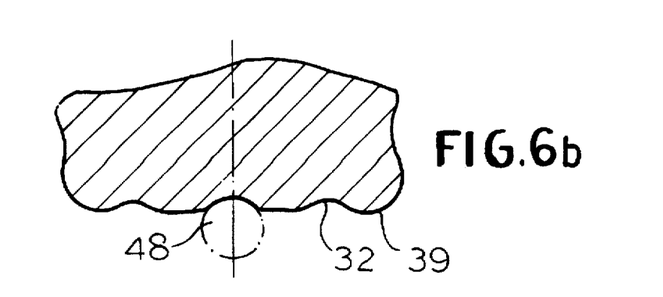
FIG. 6b is a section taken along line B—B of FIG. 6.

In a further embodiment according to FIG. 6 the recesses 32 are differently inclined with respect to a perpendicular from the cutting edge. While the central recess 32 is aligned with its longitudinal axis substantially perpendicular to the cutting edge, the angle $\alpha$ of the adjacent recesses are set to as much as 45°, preferably up to 10°. The shape of the recess 32 can be seen from the section according to FIG. 6a. The recesses 32 are thus so shaped that an imaginary cylindrical body 48 with an upper spherical head can be partially accommodated. Instead of the cylindrical head other bodies of revolution, such as a cone, are usable. The corresponding inclination angle $\alpha_3$ which forms an imaginary cylinder axis against the land, extends at between 10° and 30°, preferably 5°, less than the free angle $\alpha_1$. The diameter d of the imaginary body is 0.5 mm to 20 mm, preferably 7 mm to 14 mm. The corresponding recesses 32 are formed wavy along a section line B—B as shown in FIG. 4.

Figure 7:
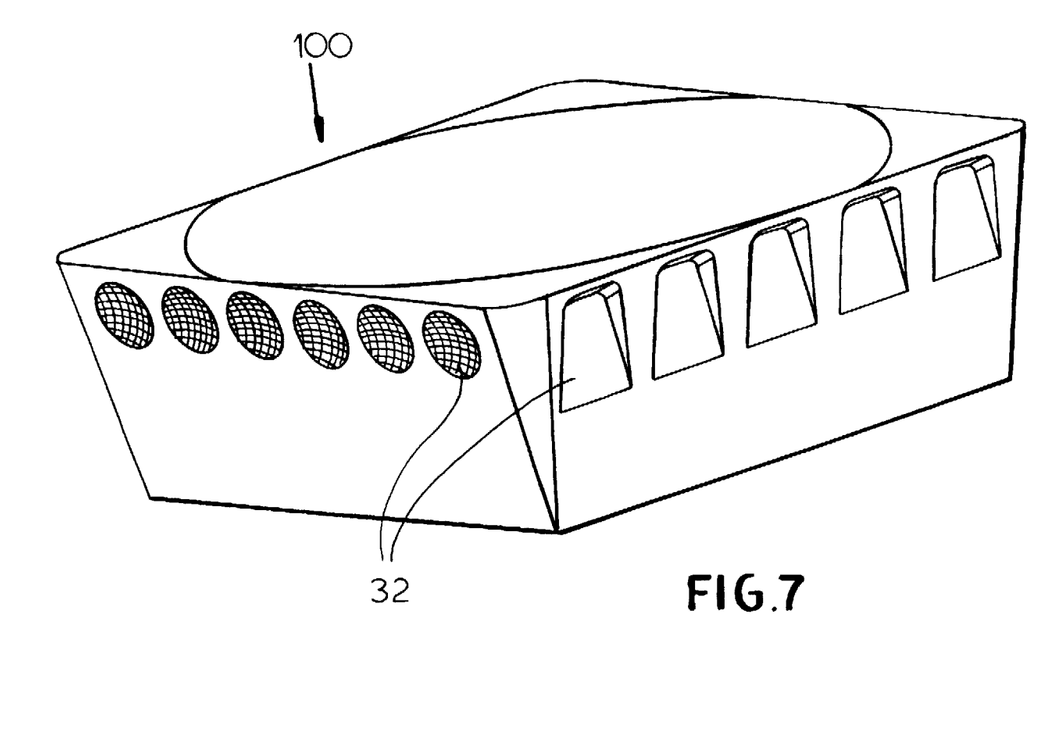
FIGS. 7 and 8 are elevational views of further embodiments of the cutting insert.
Figure 8:
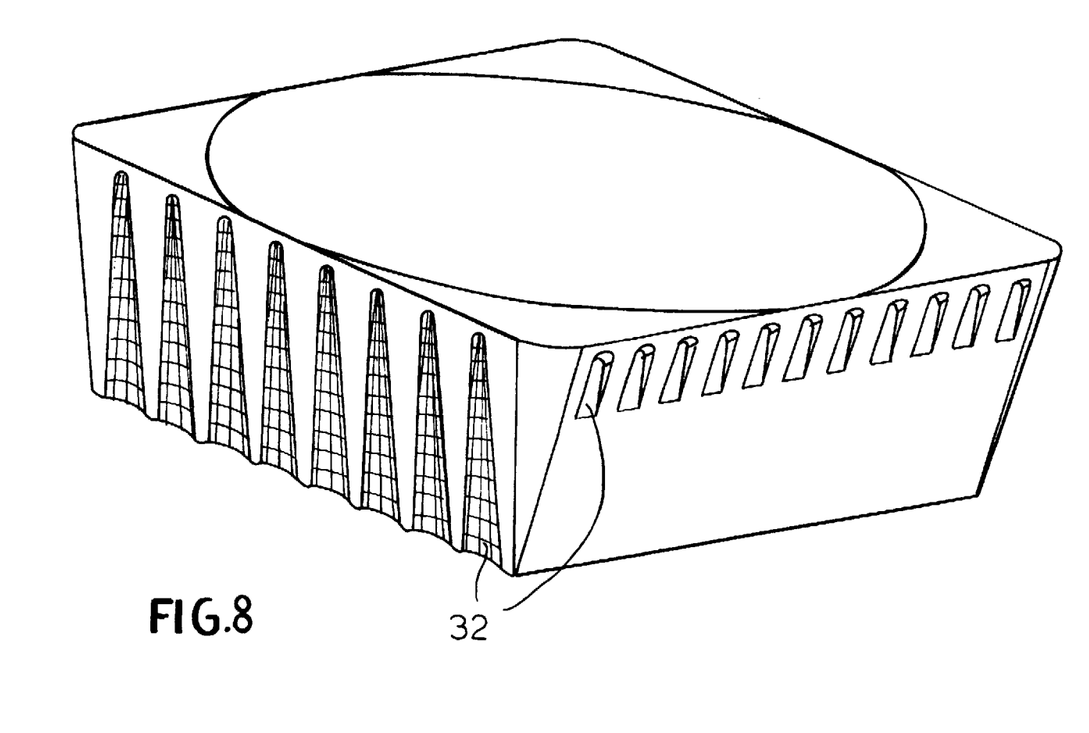

In the embodiments shown in FIGS. 7 and 8 of the cutting insert 100 it is clear that the recesses 32 have a round, frustoconical, or other geometrical outer shape, the recess itself being concave, convex, partly cylindrical, or partly elliptically curved and even a straight shape inclined inward to the cutting edge is possible. The recesses can thus be limited to the land or extend to an edge of the land at the base of the cutting insert.

The portion shown in FIG. 9 from a top view of the land has projections 50 which are shaped like pyramids. This pyramid shape has four inclined side faces with the short edges 52 and 53 extending parallel to the cutting edge 51 between the land 54 and corresponding pyramid side faces lying parallel to the cutting edge 51 but being of different lengths. Correspondingly the side faces with longer bases do not extend exactly perpendicular to the cutting edge 51 but are inclined slightly to one another so that the inclination $\beta$ lies between 10° and 20°. Relative to the longitudinal axis 55 of the pyramids 50, the angle $\beta$ is not the same on both sides, that is asymmetrical pyramids or frustopyramids are possible.

Figure 9A:
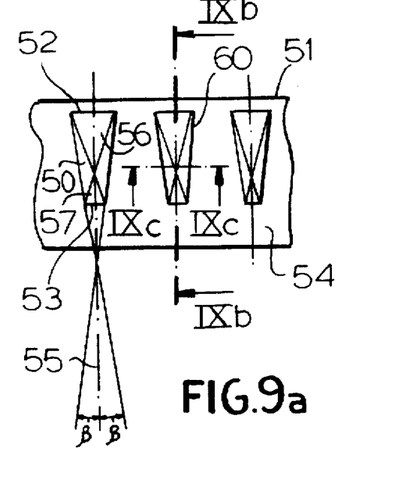
FIG. 9 shows various views of land projections.
Figure 9B:
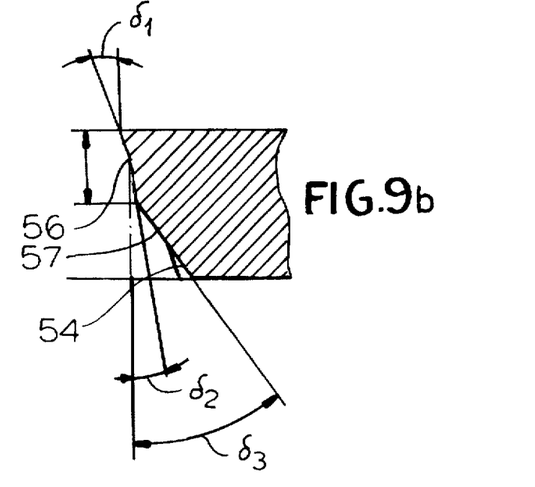
Figure 9C:
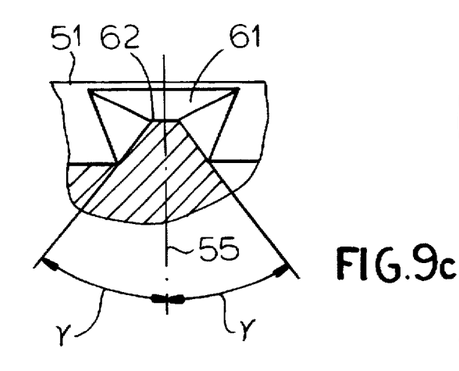
Figure 9D:
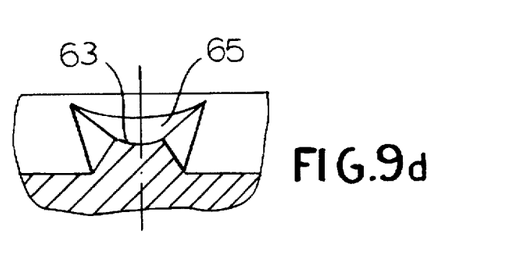
Figure 9E:
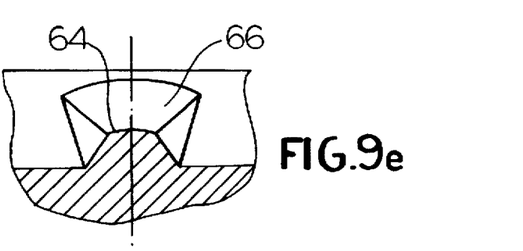

A frustopyramid 60 with a section a—a is shown by way of example in FIG. 9c. This frustopyramid has a planar side face 61 lying parallel to the cutting edge 51 which runs to or ends at a scraping edge 62 of the frustopyramid top surface. The inclination of the two flanks which extend generally perpendicular to the cutting edge is 30° to 60° while the angle $\gamma$ relative to the longitudinal axis 55 does not need to be the same for each flank. The scraping edge or the top surface of the frustopyramid can also be concave (see 63 in FIG. 9d) or convex (see 64 in FIG. 9e). Correspondingly the side flanks 65 and 66 can also be concave or convex while the side flanks 67 extending generally perpendicular to the cutting edge also can be formed convex or concave or otherwise correspondingly curved.

As can be seen from the section of FIG. 9b the respective angles of the side flanks 56 and 57 is determined by the free base angle $\delta_1$ of the land. Thus the angle of inclination $\delta_2$ is between $\delta_1 - 3°$ or the angle of the side flanks is up to 60°, preferably up to 45°, bigger than the angle of the land 56 or (when symmetrical) the same.

Figure 9F:
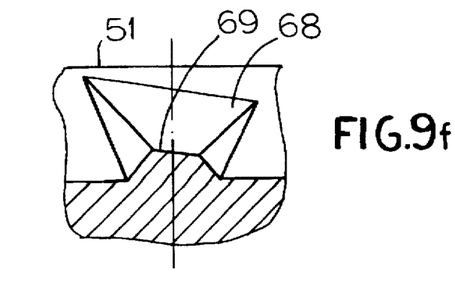

An asymmetrical shape is shown in FIG. 9f where the front frustopyramid side surface 68 is angled relative to the cutting edge 51. Correspondingly the upper scrape edge 69 or roof surface is set at an angle.

Figure 9G:
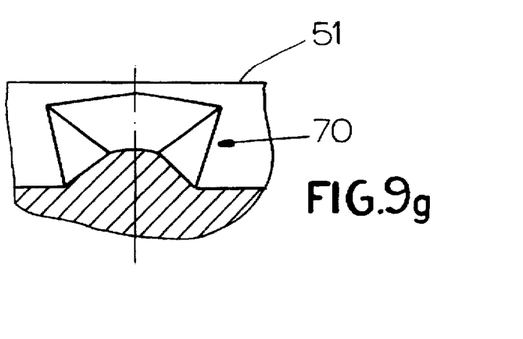

FIG. 9g shows a cutting element 70 which is shaped with facets. The maximum width of the raised shaping elements is between 0.3 mm and 1.5 mm, preferably between 0.5 mm to 1 mm.

We claim:

1. A cutting insert for chip-removing machining, having on at least one side a cutting surface with at least one cutting edge and a land extending therearound which has at a spacing from the cutting edge concavely or convexly curved land elements formed as recesses with a depth between 0.03 mm and 0.3 mm or pyramidal or frustopyramidal projections, the land adjacent the cutting edge having a contact zone which lies during machining against the workpiece, the land elements extending into the contact zone and being spaced from the cutting edge by 0.05 mm to 1 mm.

2. The cutting insert according to claim 1 wherein the land elements are in top view elongatedly circular or elongated oval, generally round, rectangular or triangular.

3. The cutting insert according to claim 2 wherein longitudinal axes of the land elements form with a perpendicular to the cutting edge on the land an angle between 0° and 45°.

4. The cutting insert according to claim 3 wherein the land elements are recesses that define a shape that is part of a cylinder with a semispherical head, a cone, or another rotation-symmetrical body, which has a diameter between 0.5 mm and 20 mm.

5. The cutting insert according to claim 4 wherein the land elements are of different lengths.

6. The cutting insert according to claim 5 wherein the spacing of the recesses from the base surface is equal to half the land height or 0 mm to 1 mm.

7. The cutting insert according to claim 6 wherein measured parallel to the cutting edge widths of the recesses are equal to between 1/10 to 1/3 of a cutting-edge length between two cutting corners or 0.3 mm to 1.5 mm.

8. The cutting insert according to claim 7 wherein measured parallel to the cutting edge the spacing of the recesses is equal to between 1/10 to 1/2 of the length of the cutting edge between two cutting corners.

9. The cutting insert according to claim 8 wherein the width and the spacing of the recesses is the same over the entire land.

10. The cutting insert according to claim 9 wherein the recesses are of different widths and are differently spaced from one another.

11. The cutting insert according to claim 10 wherein the recesses are arranged symmetrically to a perpendicular to a center of the cutting edge on the land.

12. The cutting insert according to claim 1 wherein the land elements are pyramidal or frustopyramidal projections.

13. The cutting insert according to claim 12 wherein the frustopyramidal projections form an irregular frustopyramid with two opposite base side edges of different length preferably such that the longer base side edges form an angle of 5° to 30°.

14. The cutting insert according to claim 13 wherein a roof surface of the frustopyramid is curved or the scratch edge is arced.

15. The cutting insert according to claim 12 wherein the pyramid roof surface is in top view axially asymmetrical relative to its longitudinal axis.

16. The cutting insert according to claim 15 wherein the pyramid roof surface is inclined with respect to the land.

17. The cutting insert according to claim 16 wherein the pyramid or frustopyramid side faces are planar or lightly convex or concave.

18. The cutting insert according to claim 17 wherein edges delimiting the pyramid or frustopyramid side faces are rounded.

19. The cutting insert according to claim 18 wherein two pyramid side faces are inclined to each other at an angle of 30° to 60°.

20. The cutting insert according to claim 19 wherein the land has in perpendicular section different free angles.

21. The cutting insert according to claim 20 wherein the contact zone is generally planar with respect to its height and forms a first positive free angle and that the land adjacent the contact zone forms a second positive angle between 5° and 30°.

22. The cutting insert according to claim 21 wherein transitions between the land sections arranged at various lower free angles to each other are formed concave, convex, and/or straight.

23. A cutting insert for chip-removing machining, the cutting insert being formed with:

a cutting surface;

a land surface adjacent the cutting surface, joining same at a cutting edge, and having a contact zone extending to the cutting edge and engaging a workpiece during machining thereof; and a plurality of concavely or convexly curved land elements formed on the surface, extending into the cutting zone, and spaced from the cutting edge.

24. The cutting insert defined in claim 23 wherein the land elements are recesses spaced from the cutting edge by 0.05 mm to 1 mm and of a depth between 0.03 mm and 0.3 mm.

25. The cutting insert defined in claim 23 wherein the land elements are projections spaced from the cutting edge by 0.1 mm to 1 mm.

* * * * *